(12) United States Patent
Matsubara

(10) Patent No.: US 7,414,328 B2
(45) Date of Patent: Aug. 19, 2008

(54) LIGHT CONTROL APPARATUS FOR VEHICLE

(75) Inventor: Manabu Matsubara, Kobe (JP)

(73) Assignee: Fujitsu Ten Limited (JP)

( * ) Notice: Subject to any disclaimer, the term of this patent is extended or adjusted under 35 U.S.C. 154(b) by 277 days.

(21) Appl. No.: 10/982,426

(22) Filed: Nov. 5, 2004

(65) Prior Publication Data
US 2005/0099067 A1    May 12, 2005

(30) Foreign Application Priority Data
Nov. 6, 2003 (JP) .............................. 2003-376978

(51) Int. Cl.
     *B60L 1/14*     (2006.01)
(52) U.S. Cl. .................................... 307/10.8
(58) Field of Classification Search ................. 307/10.8
See application file for complete search history.

(56) References Cited

U.S. PATENT DOCUMENTS 7,048,423 B2 *   5/2006   Stepanenko et al. ......... 362/507

FOREIGN PATENT DOCUMENTS

| JP | 7 139454 A | 5/1995 |
| JP | 8 91113 A | 4/1996 |
| JP | 8 127284 A | 5/1996 |
| JP | 11 245712 A | 9/1999 |

* cited by examiner

*Primary Examiner*—Michael J Sherry
*Assistant Examiner*—Hai I Kaplan
(74) *Attorney, Agent, or Firm*—Fogg & Powers LLC; Gregory M. Taylor

(57) ABSTRACT

Disclosed is a light control apparatus for a vehicle, in which a control function is activated when an ignition switch or an accessory switch is turned on, and which, when the switch is turned off with headlights and/or sidemarker lights kept ON, keeps the headlights and/or the sidemarker lights ON, for example, until the driver's side door is opened, wherein the light control apparatus includes an operation identifying means for identifying whether the OFF operation of the switch is an operation performed by operating a key or an operation performed in response to a signal transmitted from outside the vehicle and wherein, when the OFF operation of the switch is identified by the operating identifying means as not being an operation performed by operating the key, the headlights and/or the sidemarker lights are turned off regardless of whether the driver's side door has been opened or not.

6 Claims, 13 Drawing Sheets

LIGHT CONTROL APPARATUS FOR VEHICLE

CROSS-REFERENCE TO RELATED APPLICATION

This application claims the priority of Japanese Patent Application Number 2003-376978, filed on Nov. 6, 2003.

BACKGROUND OF THE INVENTION

1. Field of the Invention

The present invention relates to a light control apparatus for a vehicle and, more particularly, to a light control apparatus for a vehicle which turns on lights for crime prevention purposes whenever the ignition switch is turned on and the engine is started.

2. Description of the Related Art

It is known in the prior art to provide a vehicle light control apparatus wherein, when the ignition switch or the accessory switch is turned on, and thereafter the switch is turned off while leaving the headlights and/or the sidemarker lights ON, the headlights and the sidemarker lights are kept turned on until the driver's side door is opened. It is also known to provide a vehicle light control apparatus which includes an automatic light ON/OFF unit for automatically turning on the headlights and the sidemarker lights when the ambient light level is low, and for automatically turning off the headlights and the sidemarker lights when the ambient light level is high.

In Japanese Patent No. 2983132, it is disclosed that, in such a vehicle light control apparatus, when stopping the engine after the engine was started by remote operation from outside the vehicle, a door open/close signal is transmitted to simulate the door open condition, thereby turning off the lights to prevent battery drain.

Japanese Unexamined Patent Publication No. H11-245712 discloses an automatic light control apparatus wherein provisions are made not to enable the automatic light control unless the key insertion switch is turned on, and thereby to prevent the battery from running low with the headlights left ON after the engine was started and subsequently stopped by a remote operation.

In a vehicle light control apparatus (hereinafter referred to as the "light control apparatus"), when the ambient light level is low, the lights must be turned on for crime prevention purposes whenever the ignition switch (hereinafter abbreviated "IG-SW") is turned on and the engine is started. In such a light control apparatus, the lights need to be turned on when the IG-SW is turned on, whether it be turned on by key insertion or by a remote operation.

FIG. 1 is a diagram for explaining an example of an operation of such a light control apparatus. The example here deals with the case where the engine is started manually.

First, when the key is inserted to set the IG-SW on and the key is turned to activate the starter (S1), the engine starts (S2). At this point, the key insertion switch (hereinafter abbreviated "k-SW") becomes ON. When the ambient light level is low, then the driver usually turns on the light switch manually to turn on the lights such as the sidemarker lights and the headlights (S3).

On the other hand, if the light control apparatus is equipped with an automatic light ON/OFF unit, the automatic light switch (hereinafter referred to as the "automatic light SW") is set ON when the IG-SW is turned on. Then, if the ambient light sensor determines that the ambient light level is low, the lights such as the sidemarker lights and the headlights are automatically turned on (S4).

When the engine is stopped by turning off the IG-SW (S5), if the lights had been turned on manually, the lights remain ON. On the other hand, if the automatic light SW is ON, the lights remain ON if the ambient light level is low (S6). The lights will be turned off if, for example, one of the following three conditions is satisfied:

1) Vehicle door such as driver's side door is opened (S7);
2) Vehicle door such as driver's side door is opened, and then closed (S8);
3) Predetermined time has elapsed after opening and then closing vehicle door such as driver's side door (S9).

Which condition to use can be determined appropriately. When the predetermined one of the three conditions is satisfied, the lights are turned off (S10). This prevents battery drain (S11).

FIG. 2 is a diagram for explaining another example of operation of the light control apparatus. The example here deals with the case where the engine is started by turning on the IG-SW by such means as a remote operation.

Suppose, for example, that the lights were turned off by opening and then closing the door with the manual light SW left in the ON position; in this condition (the condition in S10 of FIG. 1), when the IG-SW is turned on (S1), the lights turn on (S3). Or, when the IG-SW is turned on, the automatic light SW becomes ON, and the lights turn on if the ambient light level is low (S3).

In this condition, if the IG-SW is turned off by transmitting an engine stop signal by remote operation from outside the vehicle (S4), the lights remain ON unless the prescribed condition, for example, the condition that the driver's side door is opened, is satisfied (S5). In this way, when the IG-SW is turned on or off by remote operation, as the driver's side door is not actually opened or closed, the lights remain ON, which drains the battery (S6). This can happen, for example, when warming up the engine by turning on and off the IG-SW by remote operation.

SUMMARY OF THE INVENTION

It is an object of the present invention to provide a light control apparatus that turns on the lights for crime prevention purposes whenever the IG-SW is turned on, wherein the light control apparatus is designed to prevent the battery from draining with the lights left ON when not necessary.

The present invention provides a light control apparatus for a vehicle which, when an ignition switch or an accessory switch is turned off with the setting of vehicle lights left in an ON position and with the lights kept ON, keeps the lights ON until a vehicle door is opened and/or closed, wherein the light control apparatus includes an operation identifying means for identifying whether an operation of the switch is an operation performed by operating a key or not, and wherein with the setting of the lights left in the ON position, when an ON operation of the switch is identified by the identifying means as not being an operation performed by operating the key, the lights are turned on, and when the OFF operation of the switch is identified by the identifying means as not being an operation performed by operating the key, the lights are turned off regardless of whether the vehicle door has been opened and/or closed.

Alternatively, the light control apparatus includes an operation identifying means for identifying whether an operation of the switch is an operation performed in response to a signal transmitted from outside the vehicle, wherein with the setting of the lights left in the ON position, when the ON operation of the switch is identified by the identifying means as being an operation performed in response to a signal transmitted from outside the vehicle, the lights are turned on, and when the OFF operation of the switch is identified by the identifying means as being an operation performed in response to a signal transmitted from outside the vehicle, the lights are turned off regardless of whether the vehicle door has been opened and/or closed.

Preferably, the operation identifying means identifies the operation as being an operation performed by operating the key when a key insertion switch, which becomes ON when the key is inserted, and the ignition switch or the accessory switch are turned on.

Preferably, when the engine has been started by turning on the ignition switch or the accessory switch, in response to an encrypted wireless signal, the engine is stopped:

(1) when an engine stop signal, including the encrypted wireless signal, is received, or (2) when a predetermined time has elapsed after starting the engine, or (3) when a physical action is applied to the vehicle.

The present invention also provides a light control apparatus for a vehicle which, when an ignition switch or an accessory switch is turned off with the setting of vehicle lights left in an ON position and with the lights kept ON, keeps the lights ON until a vehicle door is opened and/or closed, wherein the light control apparatus includes an operation identifying means for identifying whether the OFF operation of the switch is an operation performed by operating a key or an operation performed in response to an engine stop signal, and wherein when the OFF operation of the switch is identified by the operation identifying means as being an operation performed in response to the engine stop signal, the lights are turned off regardless of whether the vehicle door has been opened and/or closed.

Preferably, the light control apparatus includes means for turning on only sidemarker lights from among the lights when the ignition switch or the accessory switch has been turned on by an engine start signal transmitted from outside the vehicle.

Preferably, the light control apparatus includes means for selecting whether to turn on both headlights and sidemarker lights or only the sidemarker lights from among the lights when the ignition switch or the accessory switch has been turned on by an engine start signal transmitted from outside the vehicle.

Preferably, the light control apparatus includes means for performing an operation to determine whether to turn on turning on both headlights and sidemarker lights or only the sidemarker lights from among the lights by in response to a remote control signal transmitted from outside the vehicle.

In a vehicle light control apparatus, when the ambient light level is low, the lights must be turned on for crime prevention purposes whenever the IG-SW is turned on and the engine is started. In such a light control apparatus, the lights must be turned on when the IG-SW is turned on, whether it be turned on by key insertion or by an engine start signal transmitted by such means as remote operation. According to the present invention, the condition based on which to turn off the lights is changed depending on whether the engine has been started by operating the key or by an engine start signal transmitted from outside the vehicle, and battery drain is thus prevented by turning off the lights when the engine is stopped.

Furthermore, as provisions are made to be able to selectively turn on the headlights and the sidemarker lights when the engine is started or to be able to turn on and off the headlights while the engine is running, the necessary lights can be turned on according to the situation.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 3:
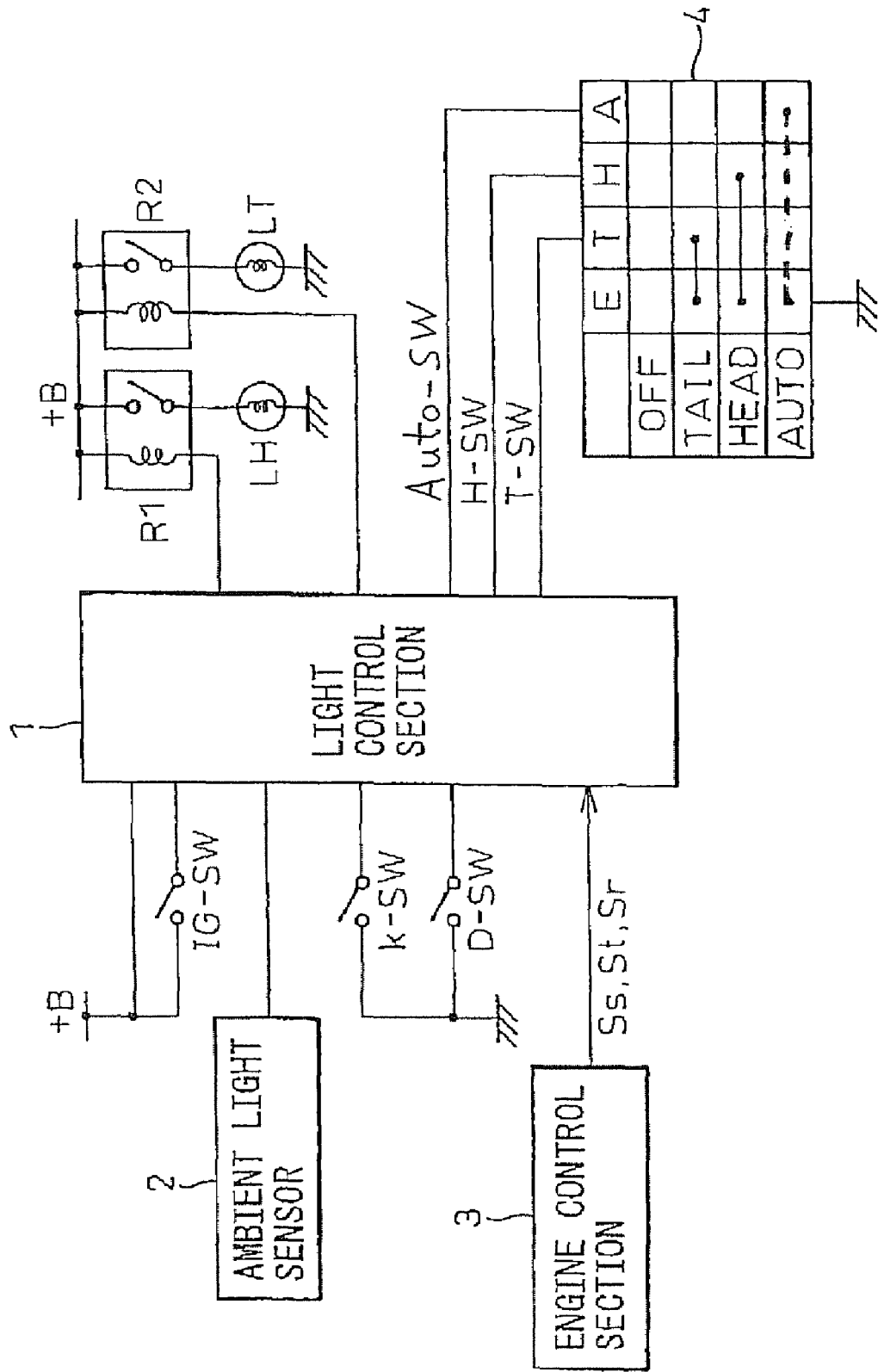
FIG. 3 is a block diagram showing the configuration of a vehicle light control apparatus according to the present invention.

FIG. 3 is a block diagram showing the configuration of a vehicle light control apparatus according to the present invention. Reference numeral 1 is a light control section, and relays R1 and R2 are activated by signals from the light control section 1, and operate to turn on and off the headlights LH and the sidemarker lights LT, respectively. IG-SW designates an ignition switch for starting the engine, k-SW a key insertion switch which is turned on/off when the key is inserted/removed, and D-SW an open/close switch for the driver's side door, which, in the embodiments of the present invention, is set to turn on when the door is opened and to turn off when the door is closed. This switch may be set the opposite way. Reference numeral 2 is an ambient light sensor, which sends a signal to the light control section 1 when the ambient light level is lower than a predetermined value. Reference numeral 3 is an engine control section, which sends an engine start signal Ss, an engine stop signal St, and a light control signal Sr to the light control section. The engine control section 3 is shown in FIG. 4.

Auto-SW designates an automatic light switch; when this switch is ON, an automatic light ON/OFF means in the light control section 1 is enabled. Turning on the automatic light switch enables the lights to be turned ON and OFF automatically. H-SW designates a headlight switch, and T-SW is a sidemarker light switch. Table 4 shows the states of these three switches, in which E represents earth (ground), T the sidemarker lights, H the headlights, and A the automatic light switch. The vertical column shows the operating states of the three switches: OFF indicates that all the three switches are OFF; TAIL indicates that T-SW is ON, meaning that only the sidemarker lights are ON; HEAD indicates that T-SW and H-SW are ON, meaning that the sidemarker lights and the headlights are ON; and AUTO indicates that Auto-SW is ON, meaning that the sidemarker lights and the headlights are turned on when the ambient light sensor detects that the ambient light level is lower than a predetermined value.

Figure 4:
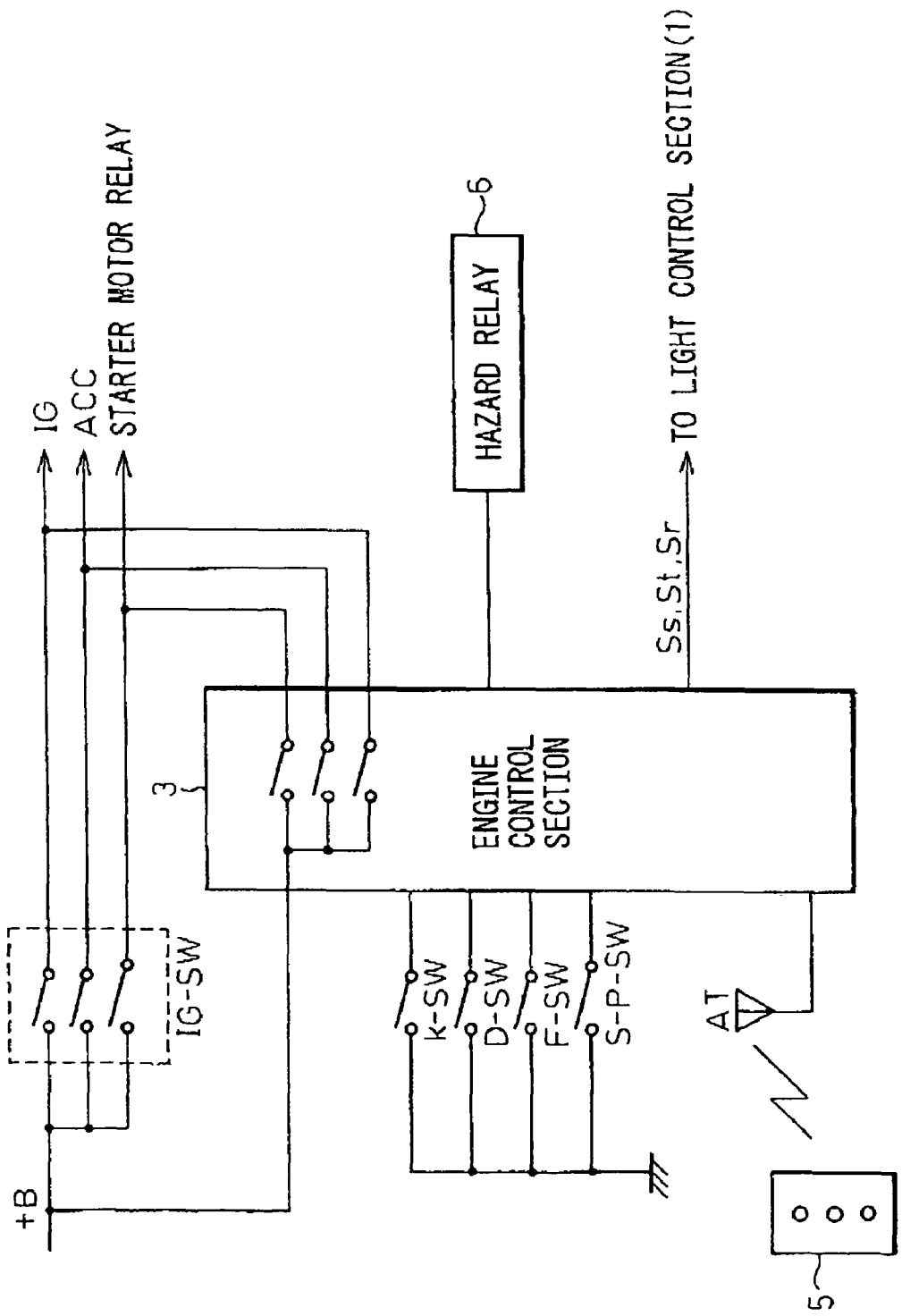
FIG. 4 is a block diagram showing a configuration example of an engine control apparatus.

FIG. 4 is a block diagram showing a configuration example of an engine control apparatus. Reference numeral 3 indicates the engine control section; when the IG-SW is turned on, an ignition IG, an accessory ACC, and a starter motor relay turn on. As earlier described, k-SW designates the key insertion switch which is turned on/off when the key is inserted/removed, and D-SW the open/close switch for the driver's side door. Further, F-SW designates a hood switch, and S-P-SW a shift position switch.

Reference numeral 5 is a remote control unit, which transmits signals to the engine control section via an antenna AT to control the engine start/stop, light ON/OFF, and other associated operations. Reference numeral 6 is a hazard relay. The engine control section 3 sends the engine start signal Ss, engine stop signal St, and light control signal Sr to the light control section 1.

Embodiment 1

Figure 5:
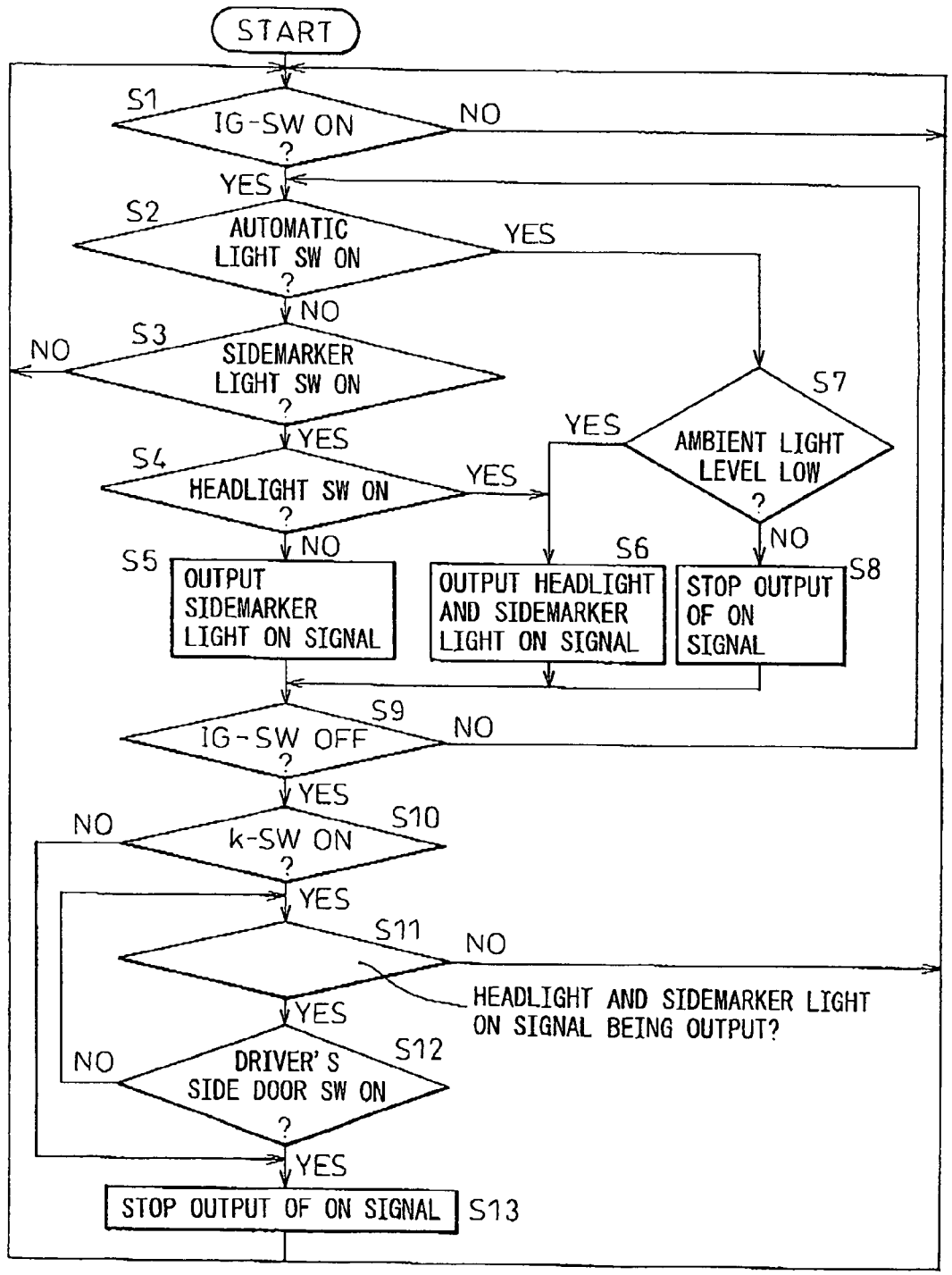
FIG. 5 is a flowchart illustrating the operation of a vehicle light control apparatus according to a first embodiment of the present invention.

FIG. 5 is a flowchart illustrating the operation of a vehicle light control apparatus according to a first embodiment of the present invention. The operation of this flowchart is controlled by the light control section 1 of FIG. 3. This also applies to the other embodiments described herein.

According to this embodiment, the condition based on which to turn turning off the lights is changed based on the result determined by identifying whether the IG-SW was turned on by key insertion or by other means such as remote operation, and the battery is thus prevented in order to prevent the battery from draining with the lights left ON.

In FIG. 5, first it is determined whether the IG-SW is ON or not (S1). If it is ON (YES), then it is determined whether the automatic light SW is ON or not (S2). If the automatic light SW is OFF (NO), it is determined whether the sidemarker light switch is ON or not (S3). If the sidemarker light switch is ON (YES), it is determined whether the headlight switch is ON or not (S4). If the headlight switch is OFF (NO), a sidemarker light ON signal is output (S5) to turn on the sidemarker lights. On the other hand, if the headlight switch is ON (YES), a headlight and sidemarker light ON signal is output (S6) to turn on the headlights as well as the sidemarker lights.

If, in S2, the automatic light SW is ON (YES), the automatic light ON/OFF means is enabled, and it is determined by the light sensor 2 in FIG. 3 whether the ambient light level is low or not (S7). If the ambient light level is low (YES), the headlight and sidemarker light ON signal is output (S6) to turn on the headlights as well as the sidemarker lights. On the other hand, if the ambient light level is not low (NO), the output of the headlight and sidemarker light ON signal is stopped (S8), and hence the headlights and the sidemarker lights are both OFF. Usually, the engine is operating in the above condition.

Figure 1:
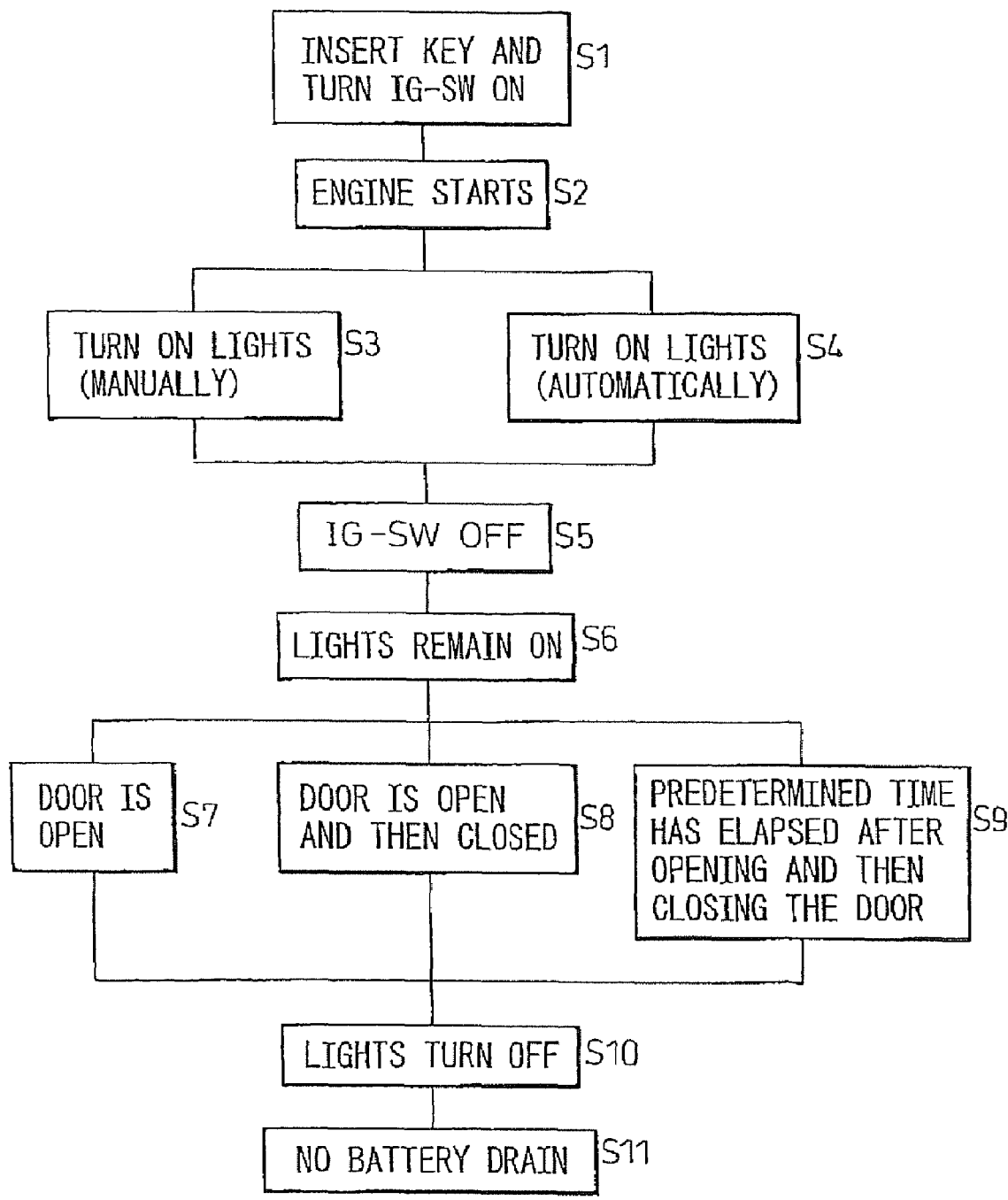
FIG. 1 is a diagram for explaining an example of operation of a vehicle light control apparatus.
Figure 2:
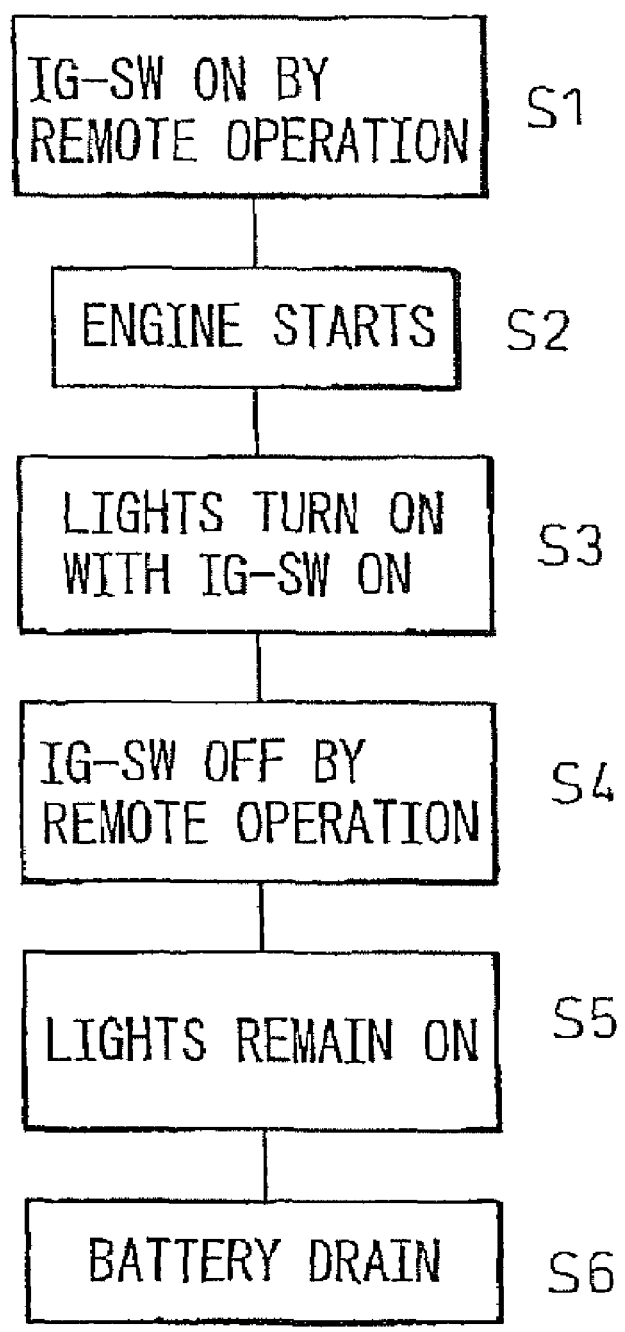
FIG. 2 is a diagram for explaining another example of operation of the vehicle light control apparatus.

In this condition, it is determined whether the IG-SW is turned off or not (S9). In the operation of the light control apparatus shown in FIG. 1, when the IG-SW is turned off, the lights are turned off by detecting, for example, the opening/closing of the door (see S7 to S9 and S10 in FIG. 1). However, when the IG-SW is turned off by remote operation, as shown in FIG. 2, as the door is not actually opened or closed, the lights remain ON though the IG-SW is OFF, and thus the battery drains (see S4 to S6 in FIG. 2).

In view of this, in the present invention, the condition based on which to turn turning off the lights is based differs changed depending on whether the k-SW is ON or OFF. More specifically, when the IG-SW is turned off, it is determined whether the k-SW is ON or not (S10). If the IG-SW was turned off by such means as remote operation, not by the k-SW, this means that the k-SW is not ON (NO); therefore, it is determined that the IG-SW was turned off by the engine stop signal (St) transmitted by remote operation, and the output of the headlight and sidemarker light ON signal is stopped (S13), whereupon the lights are turned off. This prevents the battery from draining with the lights left ON after the IG-SW was turned off.

On the other hand, if the IG-SW was turned off by operating the key, not by the engine stop signal (St), this means that the k-SW is ON (YES in S10); therefore, it is decided that the IG-SW was turned off by operating the key, and a determination is made as to whether the headlight and sidemarker light ON signal is being output or not (S11). If the answer is YES, then it is determined whether the driver's side door is opened or not (D-SW is ON or not) (S12); if the answer is YES, the output of the headlight and sidemarker light ON signal is stopped (S13), whereupon the lights are turned off. In this case also, the battery is prevented from draining with the lights left ON after the IG-SW was turned off.

If, in S12, it is determined that the driver's side door is not opened (D-SW is OFF) (NO), the process returns to S11.

If the IG-SW is not OFF in S9 (NO), the process returns to S2. On the other hand, when the IG-SW is not ON in S1 (NO), or when the headlight and sidemarker light ON signal is not being output in S11 (NO), the process returns to S1.

In the above embodiment, the control function is activated when the IG-SW is turned on, but alternatively, the control function may be activated when either the IG-SW or the accessory switch is turned on. This also applies to the other embodiments described herein.

Variation (1) of Embodiment 1

Figure 6:
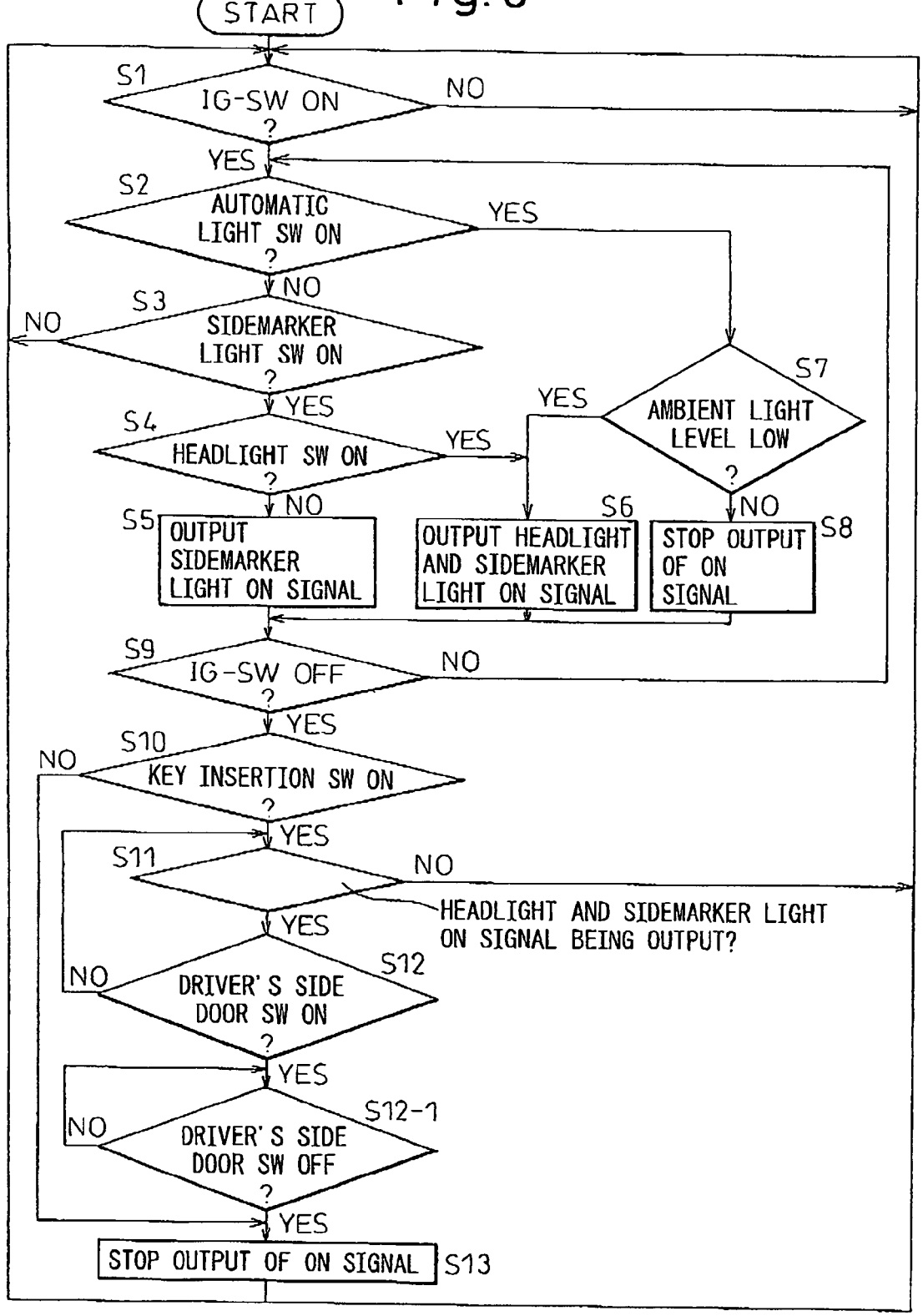
FIG. 6 is a flowchart illustrating the operation of the vehicle light control apparatus according to a variation (1) of the first embodiment of the present invention.

FIG. 6 is a flowchart illustrating the operation of the vehicle light control apparatus according to a variation (1) of the first embodiment of the present invention.

This example is the same as the first embodiment in that the condition based on which to turn turning off the lights is changed based on the result determined by identifying whether the IG-SW was turned on off by operating the key insertion or by transmitting the engine stop signal (St) by such other means such as remote operation, and the battery is thus prevented in order to prevent the battery from draining with the lights left ON.

The flowchart of FIG. 6 showing the variation (1) of the first embodiment differs from the flowchart of the first embodiment by the inclusion of a step (S12-1) for determining whether the driver's side door is closed or not.

In operation, the difference is that, in the first embodiment, when it is determined that the driver's side door is opened (YES in S12), the output of the headlight and sidemarker light ON signal is stopped (S13) and the lights are thus turned off, whereas in the variation (1) of the first embodiment, when it is determined that the driver's side door is opened (YES in S12) and that the driver's side door thus opened is subsequently closed (YES in S12-1), the output of the headlight and sidemarker light ON signal is stopped (S13) and the lights are thus turned off.

Variation (2) of Embodiment 1

Figure 7:
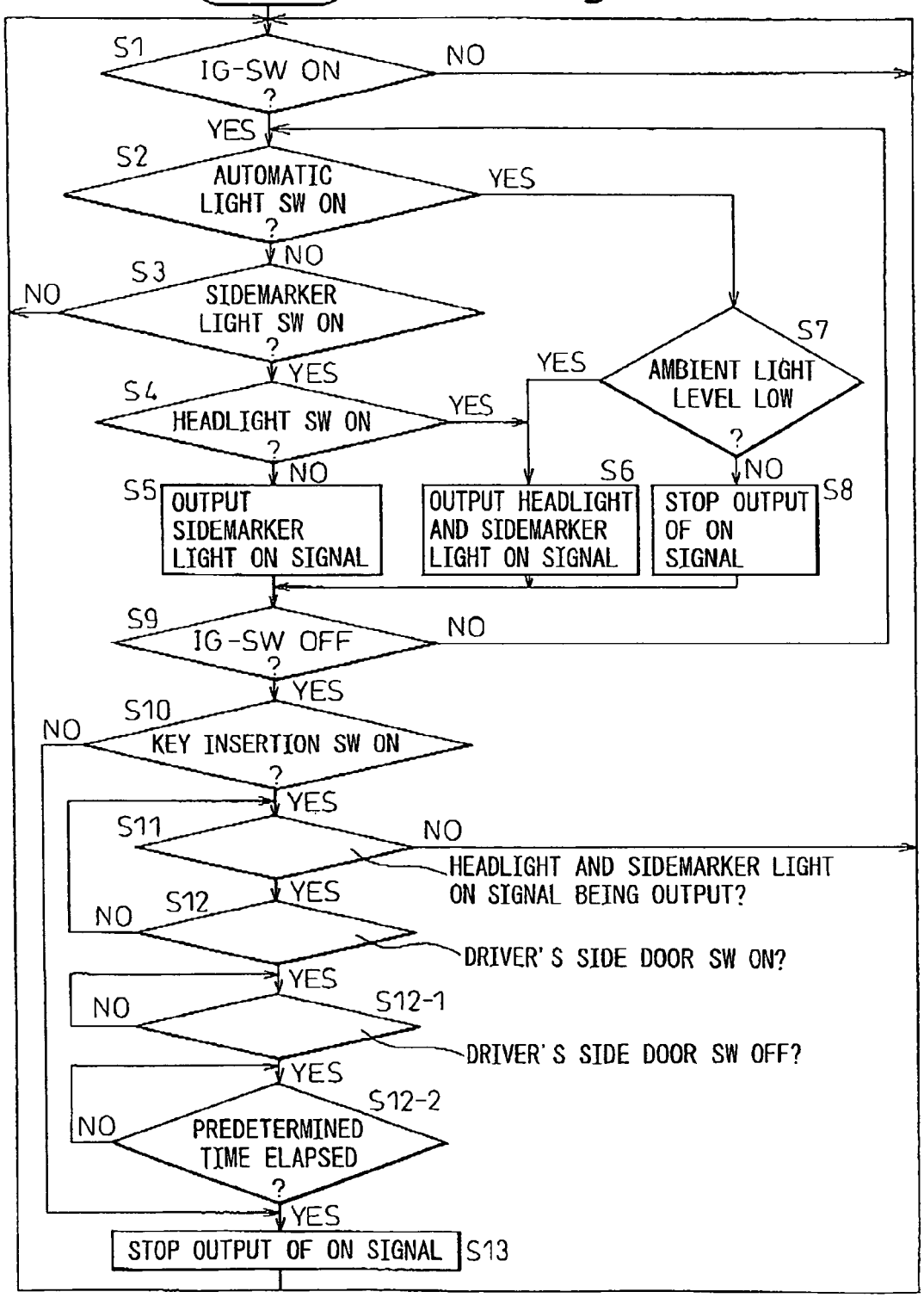
FIG. 7 is a flowchart illustrating the operation of the vehicle light control apparatus according to a variation (2) of the first embodiment of the present invention.

FIG. 7 is a flowchart illustrating the operation of the vehicle light control apparatus according to a variation (2) of the first embodiment of the present invention.

This example is the same as the first embodiment in that the condition, based on which to turn turning off the lights, is changed based on the result determined by identifying whether the IG-SW was turned on off by operating the key insertion or by transmitting the engine stop signal (St) by such other means such as a remote operation, and the battery is thus prevented in order to prevent the battery from draining with the lights left ON.

The flowchart of FIG. 7 showing the variation (2) of the first embodiment differs from the flowchart of the first embodiment by the inclusion of a step (S12-1) for determining whether the driver's side door is closed or not and a step (S12-2) for determining whether or not a predetermined time, for example, 30 seconds, has elapsed after closing the vehicle door.

In operation, the difference is that, in the first embodiment, when it is determined that the driver's side door is opened (YES in S12), the output of the headlight and sidemarker light ON signal is stopped (S13) and the lights are thus turned off, whereas, in the variation (2) of the first embodiment, when it is determined that the driver's side door is opened (YES in S12) and that the driver's side door thus opened is subsequently closed (YES in S12-1), and when it is thereafter determined that a predetermined time, for example, 30 seconds, has elapsed after closing the vehicle door (YES in S12-2), the output of the headlight and sidemarker light ON signal is stopped (S13) and the lights are thus turned off.

Variation (3) of Embodiment 1

In the first embodiment, the variation (1), and the variation (2), when the key insertion switch and the IG-SW switch or the accessory switch are ON, it can be determined that the operation is due to the operation by the key.

Variation (4) of Embodiment 1

In the first embodiment, the variation (1), and the variation (2), the engine can be started by turning on the IG-SW or the accessory switch in response to an encrypted wireless signal. In this case, provisions may be made to stop the engine when one of the following conditions is satisfied:

(1) Engine stop signal, including the encrypted wireless signal, is received.

(2) Predetermined time has elapsed after starting the engine.

(3) Physical action is applied to the vehicle.

The physical action refers to any kind of physical action performed on the vehicle, for example, a door is opened, a light switch is operated, or the steering wheel is operated.

The encrypted wireless signal is transmitted from the remote control unit 5 in FIG. 4 to the engine control section 3 via the antenna AT, and the engine is started or stopped when it matches the code number stored in the engine control section.

Embodiment 2

Figure 8:
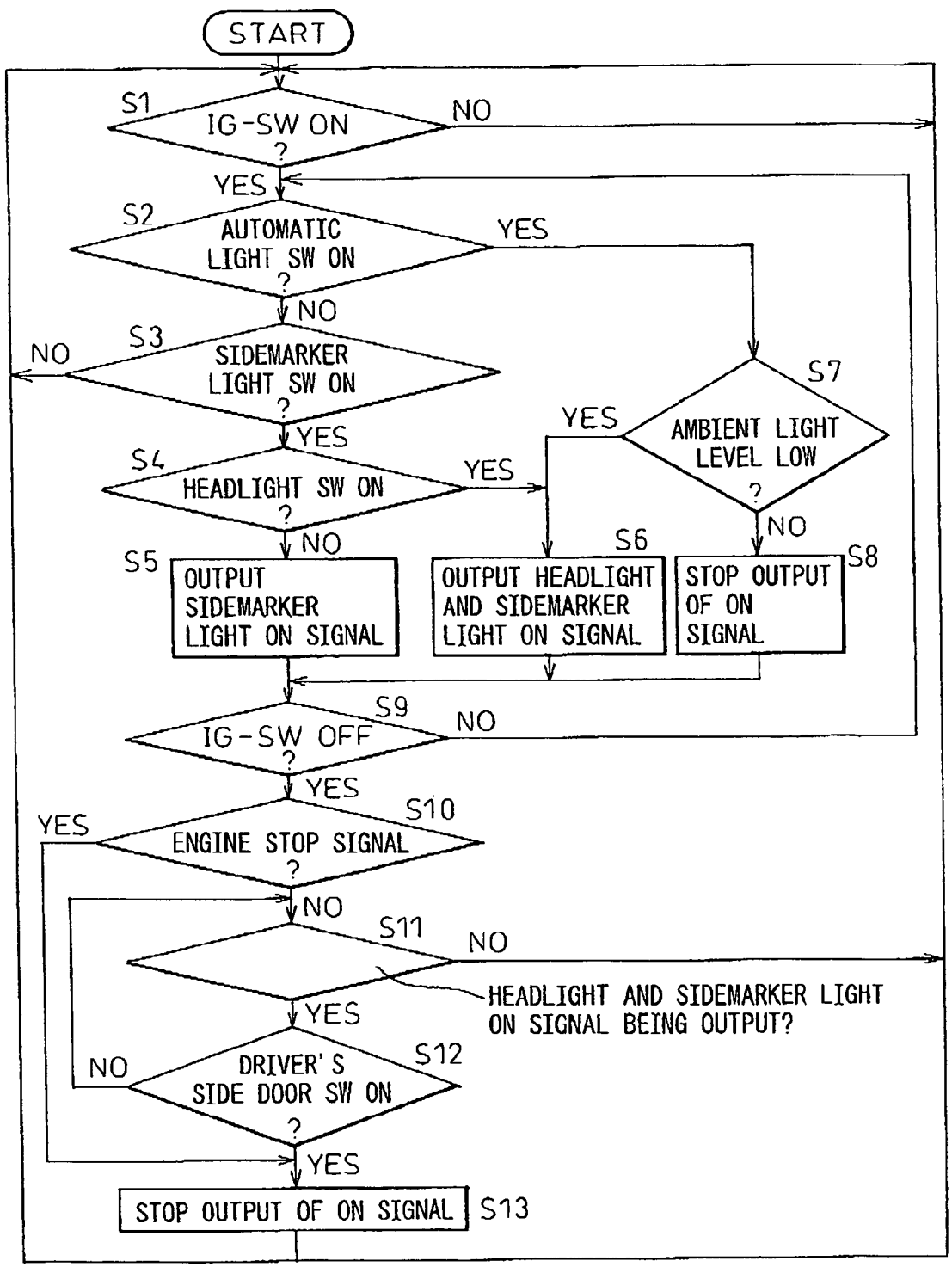
FIG. 8 is a flowchart illustrating the operation of a vehicle light control apparatus according to a second embodiment of the present invention.

FIG. 8 is a flowchart illustrating the operation of a vehicle light control apparatus according to a second embodiment of the present invention.

According to this embodiment, the condition based on which to turn turning off the lights is changed based on the result determined by identifying whether the IG-SW was turned on off by operating the key insertion or by transmitting the engine stop signal (St) by such other means such as a remote operation, and the battery is thus prevented in order to prevent the battery from draining with the lights left ON.

In FIG. 8, first it is determined whether the IG-SW is ON or not (S1). If it is ON (YES), then it is determined whether the automatic light SW is ON or not (S2). If the automatic light SW is OFF (NO), it is determined whether the sidemarker light switch is ON or not (S3). If the sidemarker light switch is ON (YES), it is determined whether the headlight switch is ON or not (S4). If the headlight switch is OFF (NO), a sidemarker light ON signal is output (S5). On the other hand, if the headlight switch is ON (YES), a headlight and sidemarker light ON signal is output (S6).

If, in S2, the automatic light SW is ON (YES), it is determined whether the ambient light level is low or not (S7). If the ambient light level is low (YES), the headlight and sidemarker light ON signal is output (S6). On the other hand, if the ambient light level is not low (NO), the output of the headlight and sidemarker light ON signal is stopped (S8).

In this condition, it is determined whether the IG-SW is turned off or not (S9). In the operation of the light control apparatus shown in FIG. 1, when the IG-SW is turned off (YES), the lights are turned off by detecting, for example, the opening/closing of the door (see S7 to S9 and S10 in FIG. 1). However, when the IG-SW is turned off by remote operation, as shown in FIG. 2, as the door is not actually opened or closed, the lights remain ON though the IG-SW is OFF, and thus the battery drains (see S4 to S6 in FIG. C).

In view of this, in the present invention, the condition based on which to turn off the lights is changed depending on whether or not the IG-SW was turned off in response to the engine stop signal (St) transmitted by remote operation. More specifically, when the IG-SW is turned off (S9), it is determined whether the engine stop signal is present or not, that is, whether or not the IG-SW was turned off by transmitting the engine stop signal (S10). If it is determined that the engine stop signal is present (YES), it is determined that the IG-SW was turned off in response to the engine stop signal, and the output of the headlight and sidemarker light ON signal is stopped (S13), whereupon the lights are turned off. This prevents the battery from draining with the lights left ON after the IG-SW was turned off.

On the other hand, if the IG-SW was turned off by operating the key, not by the engine stop signal (St) transmitted by such means as remote operation, the engine stop signal is not present (NO in S10); then, it is determined whether the headlight and sidemarker light ON signal is being output or not (S11). If the answer is YES, then it is determined whether the driver's side door is opened or not (the driver's side door switch is ON or not) (S12); if the answer is YES, the output of the headlight and sidemarker light ON signal is stopped (S13), whereupon the lights are turned off. In this case also, the battery is prevented from draining with the lights left ON after the IG-SW was turned off.

If, in S12, it is determined that the driver's side door is not opened (NO), the process returns to S11.

If the IG-SW is not OFF in S9 (NO), the process returns to S2. On the other hand, when the IG-SW is not ON in S1 (NO), or when the headlight and sidemarker light ON signal is not being output in S11 (NO), the process returns to S1.

Variation (1) of Embodiment 2

Figure 9:
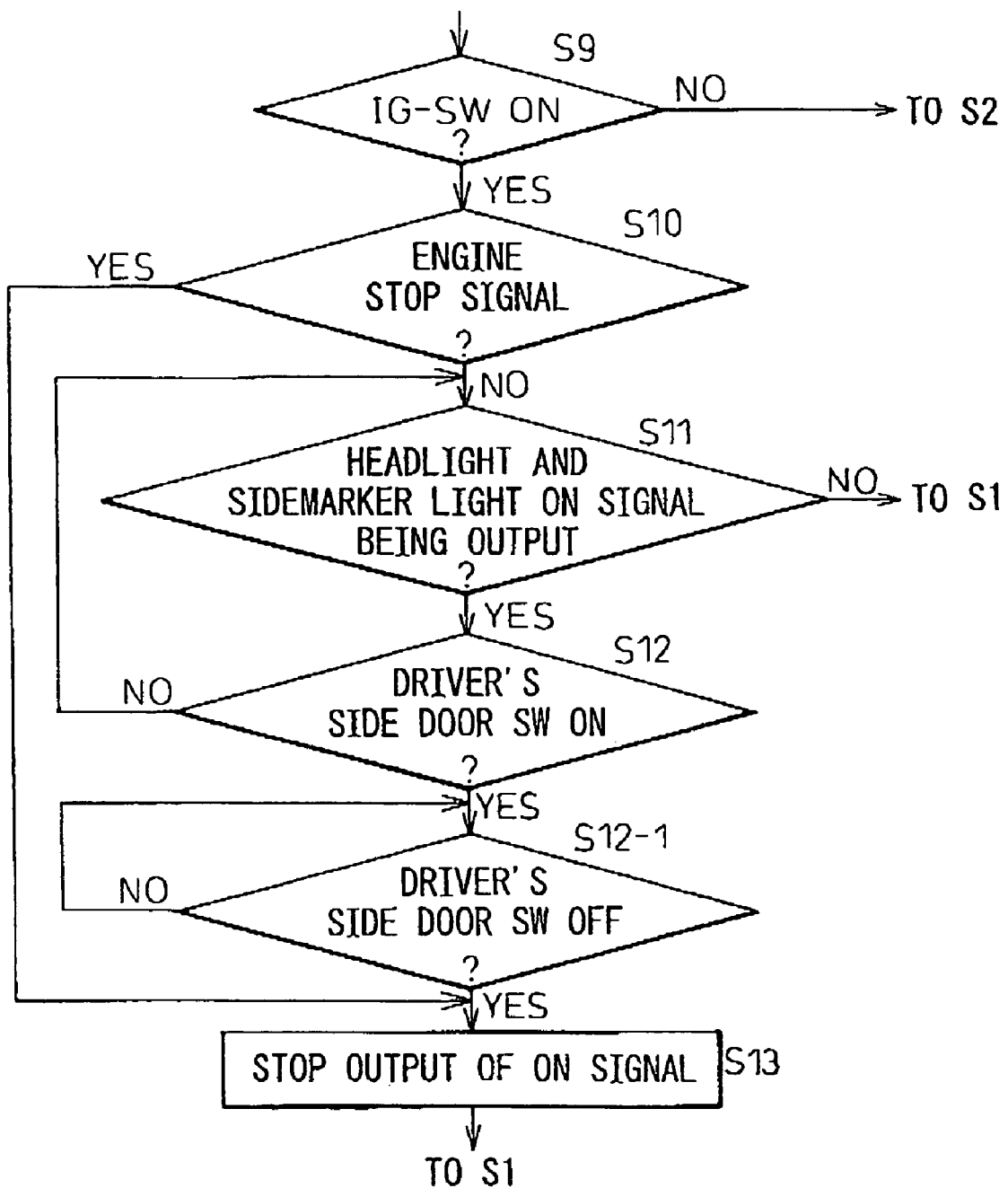
FIG. 9 is a flowchart illustrating the operation of the vehicle light control apparatus according to a variation (1) of the second embodiment of the present invention.

FIG. 9 is a flowchart illustrating the operation of the vehicle light control apparatus according to a variation (1) of the second embodiment of the present invention.

This example is the same as the second embodiment in that the condition based on which to turn turning off the lights is changed based on the result determined by identifying whether the IG-SW was turned on off by operating the key insertion or by transmitting the engine stop signal (St) by such other means such as remote operation, and the battery is thus prevented in order to prevent the battery from draining with the lights left ON.

The flowchart of FIG. 9 showing the variation (1) of the second embodiment differs from the flowchart of the second embodiment by the inclusion of a step (S12-1) for determining whether the driver's side door is closed or not.

In operation, the difference is that, in the second embodiment, when it is determined that the driver's side door is opened (the driver's side door switch is ON) (YES in S12), the output of the headlight and sidemarker light ON signal is stopped (S13) and the lights are thus turned off, whereas in the variation (1) of the second embodiment, when it is determined that the vehicle door is opened (YES in S12) and that the driver's side door thus opened is subsequently closed (the driver's side door switch is OFF) (YES in S12-1), the output of the headlight and sidemarker light ON signal is stopped (S13) and the lights are thus turned off.

Variation (2) of Embodiment 2

Figure 10:
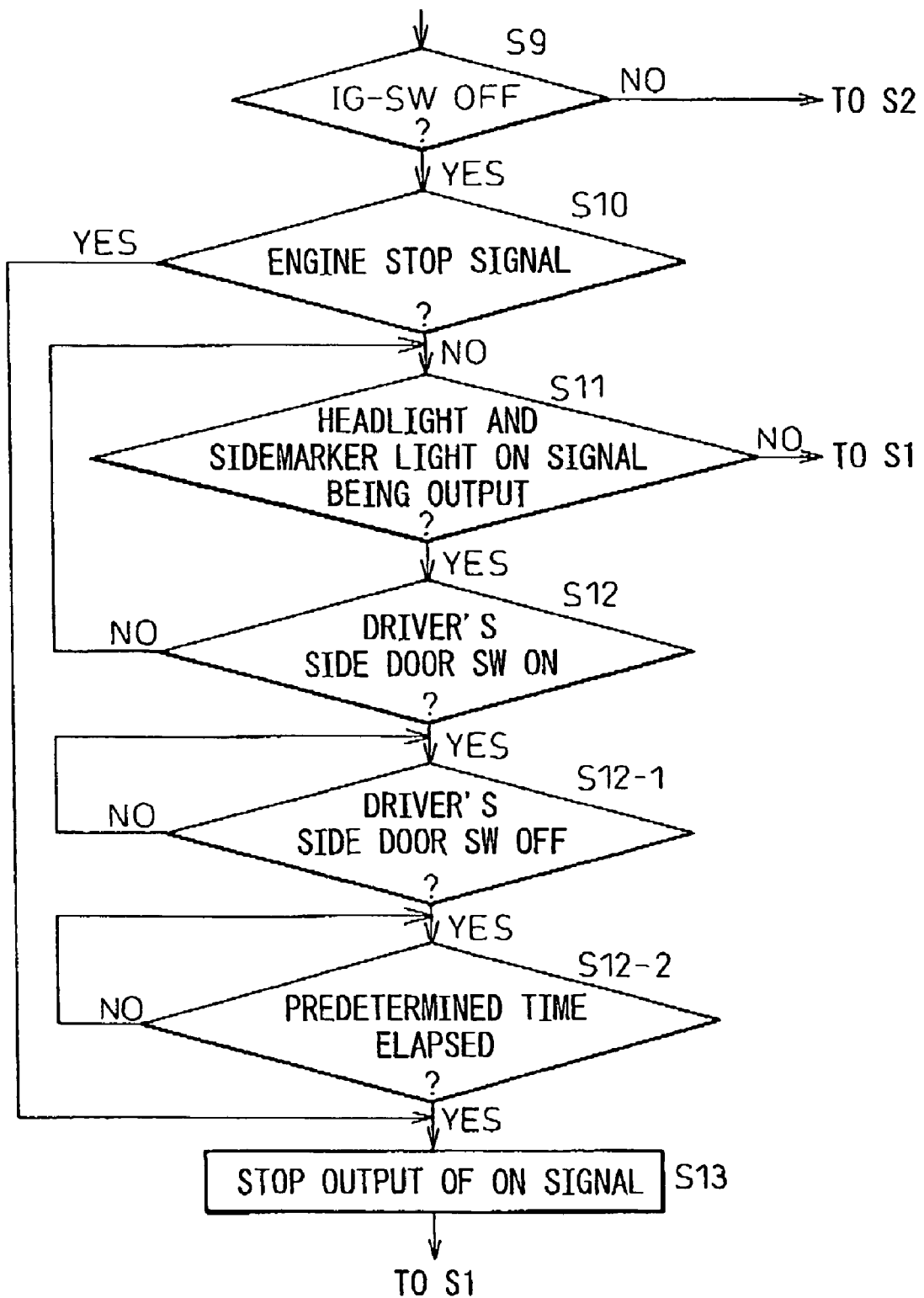
FIG. 10 is a flowchart illustrating the operation of the vehicle light control apparatus according to a variation (2) of the second embodiment of the present invention.

FIG. 10 is a flowchart illustrating the operation of the vehicle light control apparatus according to a variation (2) of the second embodiment of the present invention.

This example is the same as the second embodiment in that the condition based on which to turn turning off the lights is changed based on the result determined by identifying whether the IG-SW was turned on off by operating the key insertion or by transmitting the engine stop signal (St) by other means such as remote operation, and the battery is thus prevented in order to prevent the battery from draining with the lights left ON.

The flowchart of FIG. 10 showing the variation (2) of the second embodiment differs from the flowchart of the second embodiment by the inclusion of a step (S12-1) for determining whether the driver's side door is closed or not (the driver's side door switch is OFF or not) and a step (S12-2) for determining whether or not a predetermined time, for example, 30 seconds, has elapsed after closing the driver's side door.

In operation, the difference is that, in the second embodiment, when it is determined that the driver's side door is opened (the driver's side door switch is ON) (YES in S12), the output of the headlight and sidemarker light ON signal is stopped (S13) and the lights are thus turned off, whereas in the variation (2) of the second embodiment, when it is determined that the driver's side door is opened (YES in S12) and that the driver's side door thus opened is subsequently closed (the driver's side door switch is OFF) (YES in S12-1), and when it is thereafter determined that a predetermined time, for example, 30 seconds, has elapsed after closing the driver's side door (YES in S12-2), the output of the headlight and sidemarker light ON signal is stopped (S13) and the lights are thus turned off.

Embodiment 3

Figure 11:
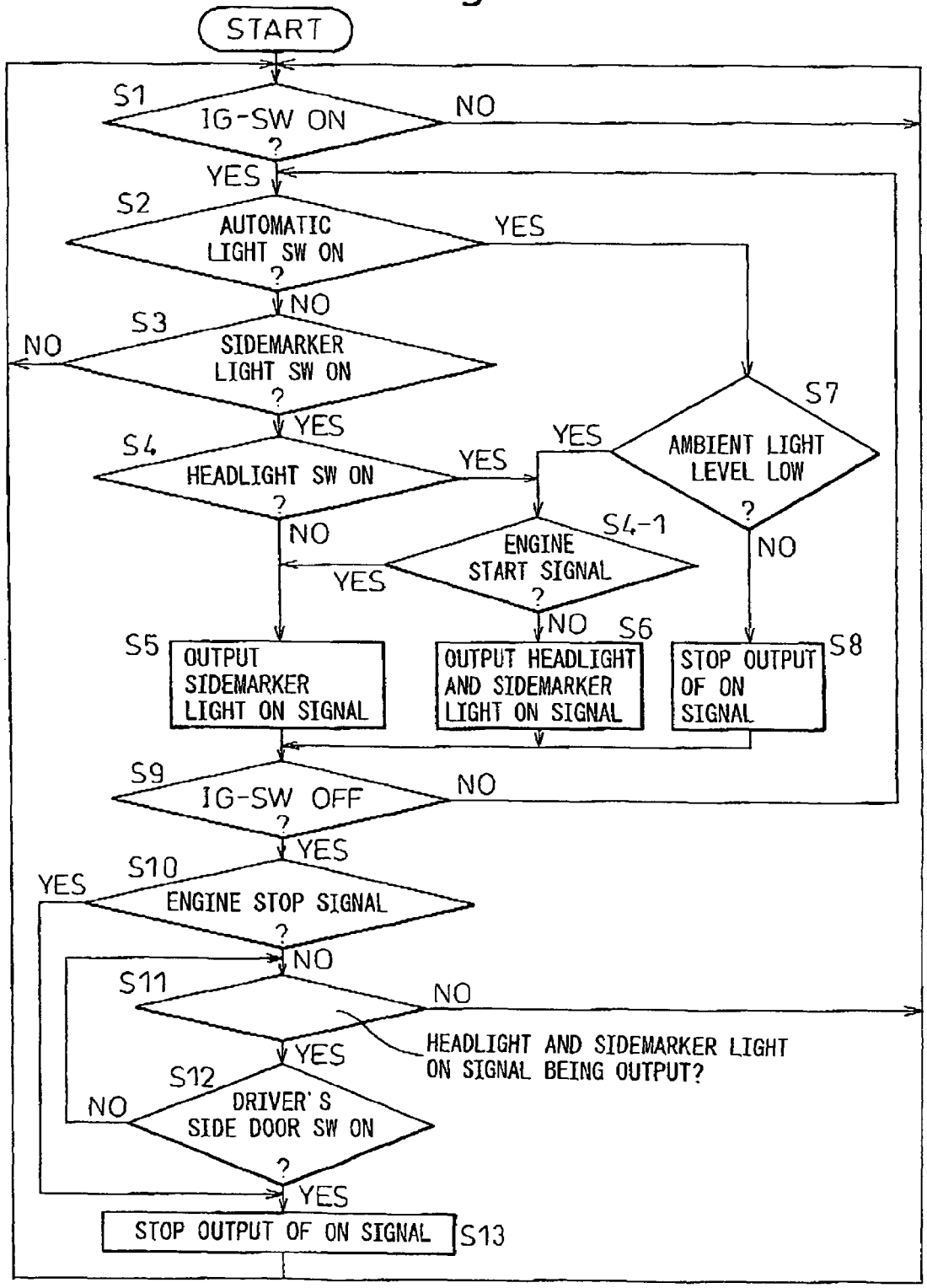
FIG. 11 is a flowchart illustrating the operation of a vehicle light control apparatus according to a third embodiment of the present invention.

FIG. 11 is a flowchart illustrating the operation of a vehicle light control apparatus according to a third embodiment of the present invention.

According to this embodiment, only the sidemarker lights are turned on during engine warm-up when the IG-SW was turned on by transmitting the engine start signal (Ss) by remote operation.

In FIG. 11, first, it is determined whether the IG-SW is ON or not (S1). If it is ON (YES), then it is determined whether the automatic light SW is ON or not (S2). If the automatic light SW is OFF (NO), it is determined whether the sidemarker light switch is ON or not (S3). If the sidemarker light switch is ON (YES), it is determined whether the headlight switch is ON or not (S4). If the headlight switch is OFF (NO), a sidemarker light ON signal is output (S5) to turn on only the sidemarker lights.

On the other hand, if the headlight switch is ON (YES in S4), it is determined whether the engine start signal is present or not (S4-1). If the answer is YES, this means that the engine was started by the engine start signal (Ss) transmitted by such means as remote operation; therefore, the sidemarker light ON signal is output (S5) to turn on only the sidemarker lights.

If, in S2, the automatic light SW is ON (YES), it is determined whether the ambient light level is low or not (S7). If the ambient light level is low (YES), it is determined whether the engine start signal is present or not (S4-1). If the answer is YES, this means that the engine was started by the engine start signal (Ss); therefore, the sidemarker light ON signal is output (S5) to turn on only the sidemarker lights while keeping the headlights OFF.

On the other hand, if the answer is NO to whether the engine start signal is present or not (S4-1), this means that the engine was not started by the engine start signal (Ss); therefore, a headlight and sidemarker light ON signal is output (S6) to turn on both the headlights and the sidemarker lights.

If the ambient light level is not low (NO in S7), the output of the headlight and sidemarker light ON signal is stopped (S8).

In this way, when the IG-SW or the accessory switch was turned on by the engine start signal transmitted from outside the vehicle by such means as remote operation, only the sidemarker lights are turned on. This embodiment can also be applied to the first and second embodiments and their variations described earlier.

In this condition, it is determined whether the IG-SW is turned off or not (S9). In the operation of the light control apparatus shown in FIG. 1, when the IG-SW is turned off (YES), the lights are turned off by detecting, for example, the opening/closing of the door (see S7 to S9 and S10 in FIG. 1). However, when the IG-SW is turned off in response to the engine stop signal transmitted by remote operation, as shown in FIG. 2, since the door is not actually opened or closed, the lights remain ON though the IG-SW is OFF, and thus the battery drains (see S4 to S6 in FIG. 2).

In view of this, in the present invention, the condition, based on which to turn turning off the lights, is based differs changed depending on whether or not the IG-SW was turned off by transmitting the engine stop signal (St). More specifically, when the IG-SW is turned off, it is determined whether the engine stop signal is present or not, that is, whether or not the IG-SW was turned off by transmitting the engine stop signal (St) (S10). If the IG-SW was turned off by the engine stop signal (St), it is determined that the engine stop signal is present (YES), and the output of the headlight and sidemarker light ON signal is stopped, thus turning off the headlights and the sidemarker lights (S13). This prevents the battery from draining with the lights left ON after the IG-SW was turned off.

On the other hand, if the IG-SW was turned off by operating the key, not by the engine stop signal (St) transmitted by remote operation, the engine stop signal is not present (NO in S10); then, it is determined whether the headlight and sidemarker light ON signal is being output or not (S11). If the answer is YES, then it is determined whether the driver's side door is opened or not (the driver's side door switch is ON or not) (S12); if the answer is YES, the output of the headlight and sidemarker light ON signal is stopped (S13), whereupon the lights are turned off. In this case also, the battery is prevented from draining with the lights left ON after the IG-SW was turned off.

If, in S12, it is determined that the driver's side door is not opened (NO), the process returns to S11.

If the IG-SW is not OFF in S9 (NO), the process returns to S2. On the other hand, when the IG-SW is not ON in S1 (NO), or when the headlight and sidemarker light ON signal is not being output in S11 (NO), the process returns to S1.

Variation (1) of Embodiment 3

In the third embodiment shown in FIG. 11, the process from S9 to S13 can be modified as shown in the variation (1) of FIG. 9.

The process from S9 to S13 in the variation (1) differs from the flowchart of the third embodiment shown in FIG. 11 by the inclusion of a step for determining whether the driver's side door is closed or not (S12-1 in FIG. 9).

In operation, the difference is that, in the third embodiment, when it is determined that the driver's side door is opened (YES in S12), the output of the headlight and sidemarker light ON signal is stopped (S13) and the lights are thus turned off, whereas in the variation (1) of the third embodiment, when it is determined that the driver's side door is opened (YES in S12) and that the driver's side door thus opened is subsequently closed (YES in S12-1), the output of the headlight and sidemarker light ON signal is stopped (S13) and the lights are thus turned off.

Variation (2) of Embodiment 3

In the third embodiment shown in FIG. 11, the process from S9 to S13 can also be modified as shown in the variation (2) of FIG. 10.

The process from S9 to S13 in the variation (2) differs from the flowchart of the third embodiment shown in FIG. 11 by the inclusion of a step for determining whether the driver's side door is closed or not (the driver's side door switch is OFF or not) (S12-1 in FIG. 10) and a step for determining whether or not a predetermined time, for example, 30 seconds, has elapsed after closing the driver's side door (S12-2 in FIG. 10).

In operation, the difference is that, in the third embodiment, when it is determined that the driver's side door is opened (the driver's side door switch is ON) (YES in S12), the output of the headlight and sidemarker light ON signal is stopped (S13) and the lights are thus turned off, whereas in the variation (2) of the third embodiment, when it is determined that the driver's side door is opened (YES in S12) and that the driver's side door thus opened is subsequently closed (the driver's side door switch is OFF) (YES in S12-1 in FIG. 10), and when it is thereafter determined that a predetermined time, for example, 30 seconds, has elapsed after closing the driver's side door (YES in S12-2 in FIG. 10), the output of the headlight and sidemarker light ON signal is stopped (S13) and the lights are thus turned off.

Embodiment 4

Figure 12:
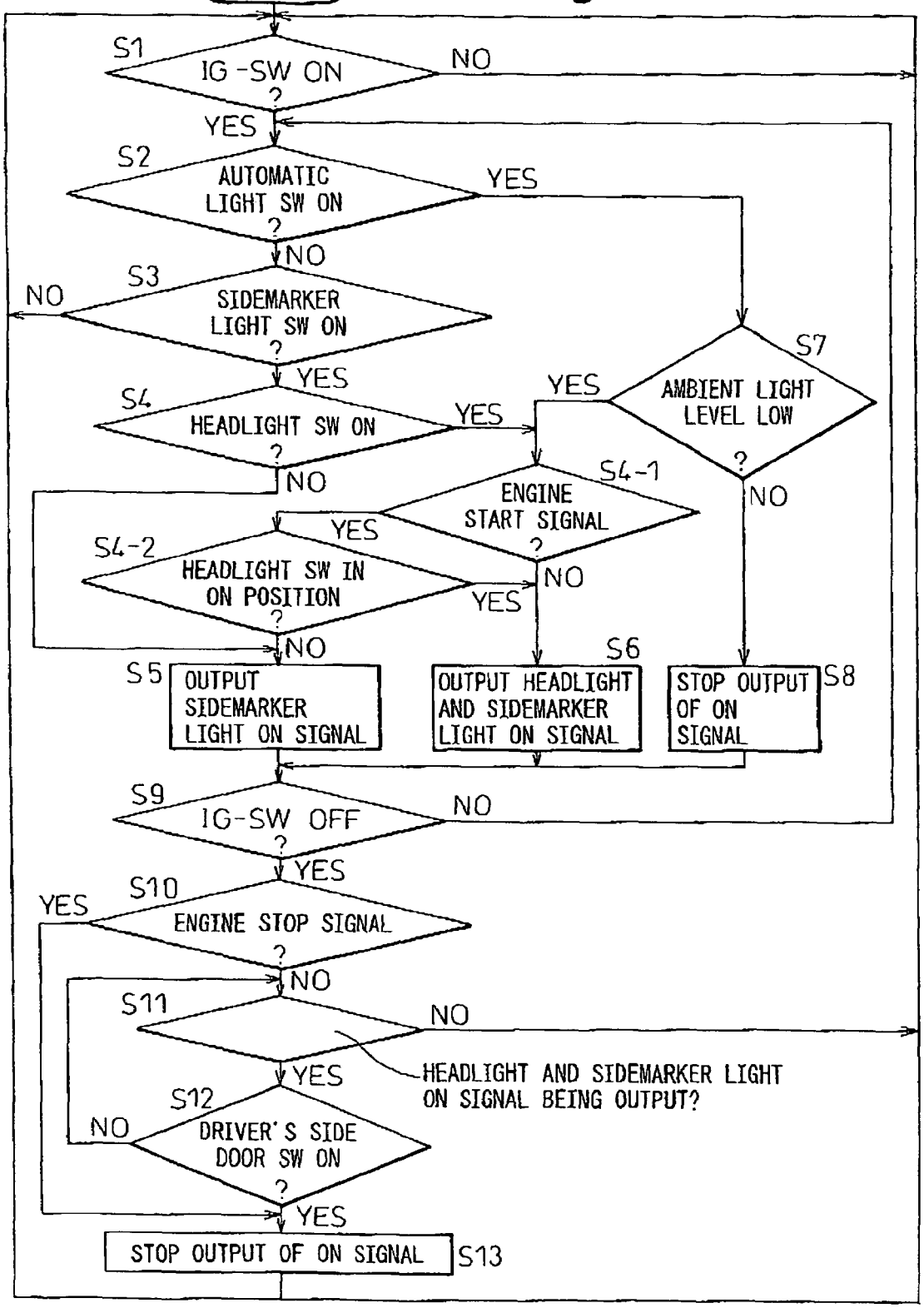
FIG. 12 is a flowchart illustrating the operation of a vehicle light control apparatus according to a fourth embodiment of the present invention.

FIG. 12 is a flowchart illustrating the operation of a vehicle light control apparatus according to a fourth embodiment of the present invention.

According to this embodiment, a choice can be made as to whether to set the headlights or the sidemarker lights ON or OFF during engine warm-up when the IG-SW was turned on by transmitting the engine start signal (Ss) by remote operation.

In FIG. 12, first it is determined whether the IG-SW is ON or not (S1). If it is ON (YES), then it is determined whether the automatic light SW is ON or not (S2). If the automatic light SW is OFF (NO), it is determined whether the sidemarker light switch is ON or not (S3). If the sidemarker light switch is ON (YES), it is determined whether the headlight switch is ON or not (S4). If the headlight switch is OFF (NO), a sidemarker light ON signal is output (S5) to turn on only the sidemarker lights.

On the other hand, if the headlight switch is ON (YES in S4), it is determined whether the engine start signal is present or not (S4-1). If the answer is YES, this means that the engine was started by the engine start signal (Ss); then, it is determined whether or not the headlight SW is set ON (S4-2) and, if the answer is YES, a headlight and sidemarker light ON signal is output (S6) to turn on the headlights and the sidemarker lights. If the answer is NO, that is, if the headlight SW is not set ON, only the sidemarker light ON signal is output to turn on only the sidemarker lights.

If the engine start signal (Ss) is not present (NO in S4-1) as when the engine was started by turning on the IG-SW by inserting the key, the headlight and sidemarker light ON signal is output (S6) to turn on the headlights and the sidemarker lights.

If, in S2, the automatic light SW is ON (YES), it is determined whether the ambient light level is low or not (S7). If the ambient light level is low (YES), the process proceeds to S4-1 to perform the processing described above. If the answer is NO, the output of the light ON signal is stopped (S8), and therefore the lights are not turned on.

As described above, there is provided a means for selecting whether to turn on both the headlights and the sidemarker lights or only the sidemarker lights when the IG-SW or the accessory switch was turned on by the engine start signal transmitted from outside the vehicle.

This embodiment can also be applied to the first and second embodiments and their variations.

The process from S9 to S13 is the same as that described in the flowchart of FIG. 11.

Variations (1) and (2) of Embodiment 4

The process from S9 to S13 in FIG. 12 can be modified as shown in FIGS. 9 and 10.

Embodiment 5

Figure 13:
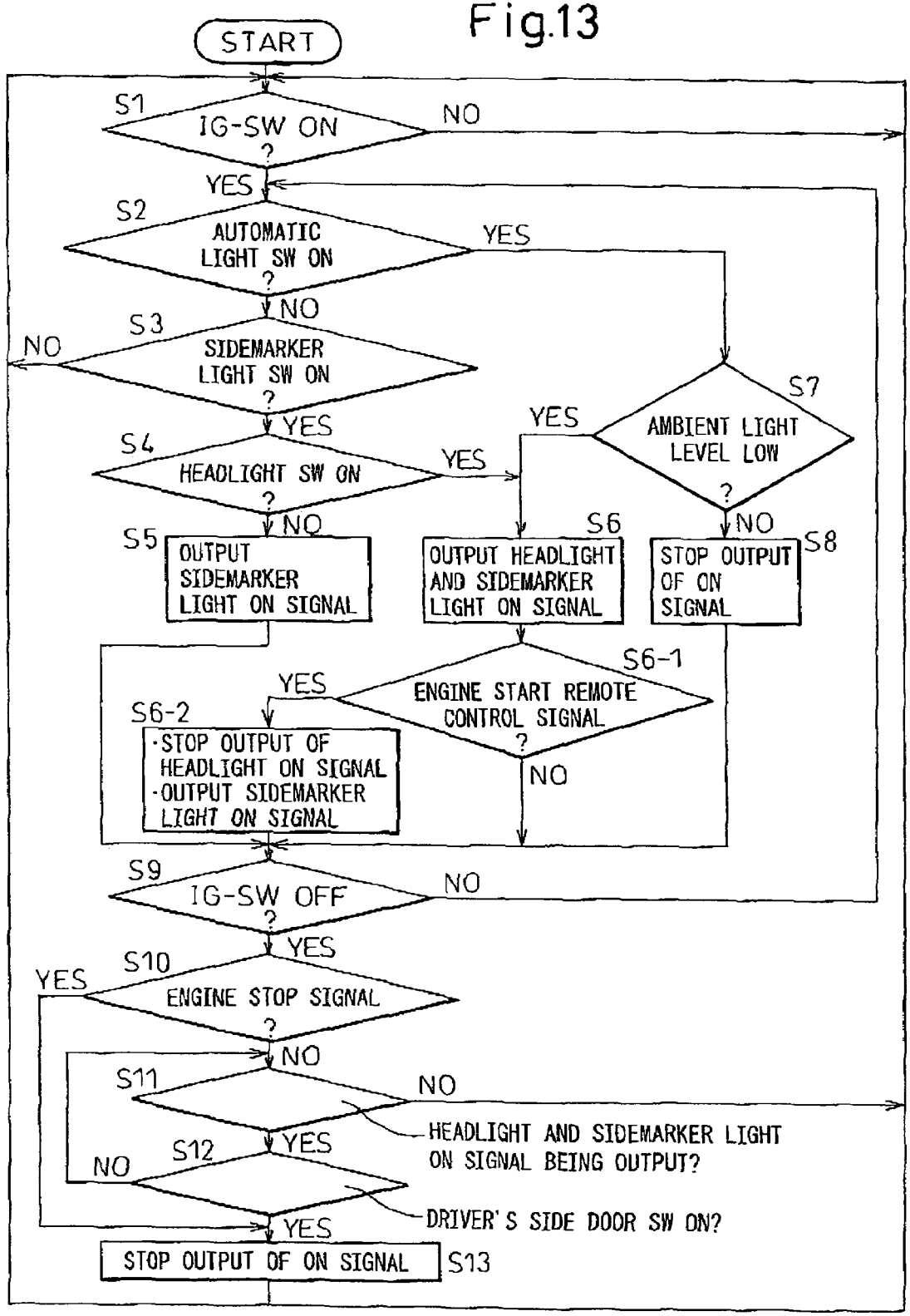
FIG. 13 is a flowchart illustrating the operation of a vehicle light control apparatus according to a fifth embodiment of the present invention.

FIG. 13 is a flowchart illustrating the operation of a vehicle light control apparatus according to a fifth embodiment of the present invention.

According to this embodiment, the headlights or the sidemarker lights can be set ON or OFF by a remote control signal from outside the vehicle during engine warm-up when the IG-SW was turned on by remote operation from outside the vehicle.

In FIG. 13, first it is determined whether the IG-SW is ON or not (S1). If it is ON (YES), then it is determined whether the automatic light SW is ON or not (S2). If the automatic light SW is OFF (NO), it is determined whether the sidemarker light switch is ON or not (S3). If the sidemarker light switch is ON (YES), it is determined whether the headlight switch is ON or not (S4). If the headlight switch is OFF (NO), a sidemarker light ON signal is output (S5). On the other hand, if the headlight switch is ON (YES), a headlight and sidemarker light ON signal is output (S6).

If, in S2, the automatic light SW is ON (YES), it is determined whether the ambient light level is low or not (S7). If the ambient light level is low (YES), the headlight and sidemarker light ON signal is output (S6). On the other hand, if the ambient light level is not low (NO), the output of the headlight and sidemarker light ON signal is stopped (S8).

When the headlight and sidemarker light ON signal is output (S6), it is determined whether a remote control signal (Sr) is present or not (S6-1). If the answer is YES, the output of the headlight ON signal is stopped, and the sidemarker light ON signal is output to turn on only the sidemarker lights. On the other hand, if the answer is NO in S6-1, the headlight and sidemarker light ON signal is output to turn on the headlights and the sidemarker lights.

As described above, there is provided a means for performing an operation to determine whether to turn on both the headlights and the sidemarker lights or only the sidemarker lights by the remote control signal transmitted from outside the vehicle. This embodiment can also be applied to the first and second embodiments and their variations. The process from S9 to S13 is the same as that described in the flowchart of FIG. 8.

Variations (1) and (2) of Embodiment 5

The process from S9 to S13 can be modified as shown in FIGS. 9 and 10.

What is claimed is:

1. A light control apparatus for a vehicle which, when an ignition switch is turned off with the setting of vehicle lights left in an ON position and with said lights kept ON, keeps said lights ON until a vehicle door is opened and/or closed, comprising:
    an automatic light ON/OFF means for automatically switching ON/OFF headlights and sidemarker lights depending on the ambient light level;
    a light control section having an operation identifying means for identifying whether ON/OFF operation of an ignition switch is an operation performed by a key or an operation performed by a remote control unit; and
    an engine control section which, upon receipt of a signal from said remote control unit, transmits an engine start signal, an engine stop signal, and a light control signal to said light control section;
    wherein said light control apparatus turns on only said sidemarker lights when said ignition switch is turned on under the condition that the ambient light level is low, said automatic light ON/OFF means is set in operation, and said operation identifying means identifies that the ON operation of said ignition switch is performed by said remote control unit; and
    wherein said light control apparatus turns off the turned on lights regardless of whether said vehicle door has been opened and/or closed when said ignition switch is turned off under the condition that said operation identifying means identifies that the OFF operation of said ignition switch is performed by said remote control unit.

2. A light control apparatus according to claim 1, wherein said light control apparatus turns on only said sidemarker lights when said ignition switch is turned on under the condition that said automatic light ON/OFF means is not set in operation, both of said headlights and sidemarker lights are set in operation and said operation identifying means identifies that the ON operation of said ignition switch is performed by said remote control unit.

3. A light control apparatus according to claim 1, wherein said light control apparatus turns on said sidemarker lights and headlights when said ignition switch is turned on under the condition that the ambient light level is low, said automatic light ON/OFF means is set in operation and said operation identifying means identifies that the ON operation of said ignition switch is not performed by said remote control unit.

4. A light control apparatus for a vehicle which, when an ignition switch is turned off with the setting of vehicle lights left in an ON position and with said lights kept ON, keeps said lights ON until a vehicle door is opened and/or closed, comprising:
    an automatic light ON/OFF means for automatically switching ON/OFF headlights and sidemarker lights depending on the ambient light level;
    a light control section having an operation identifying means for identifying whether ON/OFF operation of an ignition switch is an operation performed by a key or an operation performed by a remote control unit; and
    an engine control section which, upon receipt of a signal from said remote control unit, transmits an engine start signal, an engine stop signal, and a light control signal to said light control section;
    wherein said light control apparatus turns on both of said headlights and sidemarker lights when said ignition switch is turned on under the condition that the ambient light level is low and said automatic light ON/OFF means is set in operation;
    wherein said light control apparatus turns off said headlights when said operation identifying means identifies that the ON operation of said ignition switch is performed by said remote control unit; and
    wherein said light control apparatus turns off the turned on lights regardless of whether said vehicle door has been opened and/or closed when said ignition switch is turned off under the condition that said operation identifying means identifies that the OFF operation of said ignition switch is performed by said remote control unit.

5. A light control apparatus according to claim 4, wherein said light control apparatus turns off said headlights when said ignition switch is turned on under the condition that said automatic light ON/OFF means is not set in operation, both of said headlights and sidemarker lights are set in operation, and both of said headlights and sidemarker lights are turned on, and said operation identifying means identifies that the ON operation of said ignition switch is performed by said remote control unit.

6. A light control apparatus according to claim 4 wherein:
    said light control apparatus turns on said sidemarker lights and headlights when said ignition switch is turned on under the condition that the ambient light level is low and said automatic light ON/OFF means is set in operation, and
    said turned on sidemarker lights and headlights are kept ON when said operation identifying means identifies that the ON operation of said ignition switch is not performed by said remote control unit.

* * * * *